United States Patent [19]

Bazin

[11] Patent Number: 5,574,228

[45] Date of Patent: Nov. 12, 1996

[54] SYSTEM FOR MEASURING FLUID OSCILLATOR SIGNALS

[75] Inventor: Alain G. Bazin, Villejuif, France

[73] Assignee: Schlumberger Industries, S.A., Montrouge, France

[21] Appl. No.: 259,749

[22] Filed: Jun. 10, 1994

[30] Foreign Application Priority Data

Jun. 11, 1993 [FR] France .................................. 93 07042

[51] Int. Cl.$^6$ ...................................................... G01F 1/32
[52] U.S. Cl. .................................. 73/861.19; 324/103 P
[58] Field of Search .......................... 73/861.18, 861.19, 73/861.21, 861.22; 324/103 P; 327/58, 59, 60, 61, 62

[56] References Cited

U.S. PATENT DOCUMENTS

| | | | |
|---|---|---|---|
| 3,982,434 | 9/1976 | McMurtrie | 73/861.22 |
| 4,175,256 | 11/1979 | Dolikian | 327/61 |
| 4,581,922 | 4/1986 | Aiello | 324/103 P |
| 4,966,040 | 10/1990 | Ohmae | 73/861.22 |

FOREIGN PATENT DOCUMENTS 2449870  9/1980  France .

*Primary Examiner*—Richard Chilcot
*Assistant Examiner*—Harshad Patel
*Attorney, Agent, or Firm*—Leonard W. Pojunas

[57] ABSTRACT

A system for measuring the frequency of oscillation of the fluid in a fluid oscillator comprising detector means, a peak detector comprising a threshold device receiving a first signal from the detector means, means for storing the signal at the output of the threshold device and comparator means providing an output signal in accordance with the relative values of the first signal and the signal from the memory means.

9 Claims, 4 Drawing Sheets

SYSTEM FOR MEASURING FLUID OSCILLATOR SIGNALS

The present invention concerns a system for measuring the frequency of oscillation of a fluid within a fluid oscillator comprising detector means for detecting fluid oscillations and providing a signal representing the oscillations. The invention also relates to a flowmeter comprising a fluid oscillator and such a system.

BACKGROUND OF THE INVENTION

The commonest flowmeters for a fluid such as a gas or a liquid comprise mechanical moving parts, such as spinner or membrane flowmeters. However there are also flowmeters using fluid oscillators which do not have moving parts but which measure the vibrations of a fluid within an oscillation chamber. These oscillators can be very small and of very simple construction. Their reliability is thus very good. Moreover they provide a frequency signal whose frequency is proportional to the speed of the fluid entering the oscillation chamber. This signal can easily be converted to a digital signal. This property is particularly advantageous for reading meters remotely.

There are many forms of fluid oscillator which produce vibrations in a fluid using various effects. Vortex flowmeters use an obstruction positioned in a duct to create vortices in a fluid flowing in the duct. For an obstacle of given geometry, the frequency of detachment of the vortices is proportional to the speed of flow of the fluid. An oscillator of this kind is described in U.S. Pat. No. 4,085,615. Coanda effect oscillators use the tendency of a fluid jet to follow the contours of a wall when the jet is discharged near to the wall, even if the contour of the wall moves away from the discharge axis of the jet. A fluid oscillator of this type is described in U.S. Pat. No. 4,550,614, in which a fluid jet is discharged into a chamber with two lateral walls disposed symmetrically in the chamber relative to the discharge axis of the jet, the jet oscillating from one wall to the other. There are also other kinds of fluid oscillator which use the natural oscillation of a fluid jet emerging from a nozzle or which use other means to cause a jet to oscillate or to create vortices. The term "fluid oscillator" applies herein to any oscillator which produces fluid vibrations representative of the speed of the fluid.

The detector means, such as a pair of pressure sensors or thermal sensors disposed at different locations in the oscillation chamber, detect the fluid oscillations in the chamber. The detector means supply an alternating signal having a frequency proportional to the speed of the fluid entering the oscillation chamber. Ideally, the mean amplitude of the alternating signal should remain constant. Unfortunately asymmetries in the system, for example arising from the positioning of the sensors, can cause the mean amplitude to change with changes in frequency of the signal, sometimes very significantly. This problem arises in particular with vortex oscillators and flowmeters used in the field of industrial metering, for example in an industrial gas meter, in which the amounts and speed of the fluid are larger than those used in the field of domestic or commercial metering. This strong modulation of the signal creates problems in measuring the frequency and processing the signal to obtain the speed of flow of the fluid. Conventional techniques which compensate for the zero offset of the signal, for example by using an integrating circuit, are generally effective for slow changes in amplitude but they are not effective for rapid variations. Moreover, in the field of metering fluids in which an electric battery is used in the signal processing circuit, it is necessary for current consumption to be minimized, to prolong the life of the battery. Conventional circuits for processing and converting signals with large amplitude modulation are relatively complex and consume a lot of current. The signal supplied by the detector means can sometimes be of small amplitude and it is not easy to make use of such a signal when using a battery and consuming little power.

A circuit is known from U.S. Pat. No. 3,982,434 which reduces the low frequency components of the flow signals detected by a thermal sensor in an eddy fluid meter and extracts the high frequency components from this signal. That circuit comprises an inverting amplifier, a peak detector, a summing amplifier, and a trigger amplifier. The peak detector detects positive and negative peaks in the flow signal detected by the thermal sensor and provides a signal whose frequency corresponds to the rate of flow of the fluid.

Nevertheless, that circuit operates with relatively high supply voltages of 12V and 24V and it is not suited to battery operation, nor to small power consumption. Furthermore the circuit described in U.S. Pat. No. 3,982,434 is somewhat complex.

OBJECT AND SUMMARY OF THE INVENTION

The object of the present invention is to provide a simple system which consumes little current and which is adapted to provide a digital signal representing the frequency of oscillation of the fluid, even in the presence of significant variations in the signal, and which in particular makes it possible to process signals of small amplitude as well as those of large amplitude.

The present invention provides a system for measuring the frequency of oscillation of a fluid within a fluid oscillator comprising detector means for detecting fluid oscillations, providing a signal representing the oscillations, the detector means having a peak detector comprising a threshold device receiving a first signal corresponding to the signal representing the oscillations, the threshold device being in a conductive state when the voltage applied thereto exceeds a threshold value, the device then providing a second signal with a drop in potential relative to the first signal, means for receiving and storing the second signal, and comparison means comparing the value of the second, stored signal with the value of the first signal and providing an output signal characteristic of the relative values of the first and second signals, wherein the peak detector further comprises an amplifier which receives and amplifies the signal provided by the detector means and which provides the first signal to the threshold device, the gain of the amplifier being controlled by the second signal received from the threshold device.

The threshold device and the storing means function as a buffer memory. While the amplitude of the first signal increases, the value of the signal stored in the storing means lags behind the first signal by the value of the voltage drop across the threshold device and the comparator means provide a first output showing that the amplitude of the first signal is greater than the amplitude of the stored signal. When a peak is reached and the amplitude of the signal falls, the difference between the value of the stored signal and the amplitude of the signal itself falls below the threshold of the threshold device and the latter is no longer in a conductive state. The value of the stored signal is then fixed and when the signal falls below the level of the value of the stored signal, the comparison means provide a different output signal, showing that the amplitude of the stored signal is now greater than the amplitude of the first signal and that a peak has occurred.

The gain of the amplifier is controlled by the second signal received from the threshold device, which means that, when the amplitude of the first signal provided by the detector means is equal to or less than the threshold level of the threshold device, which is not in a conductive state, the second signal thus having a zero value, the said first signal will in consequence be amplified by the appropriate gain of the amplifier.

On the other hand, when the amplitude of the first signal increases and is greater than the threshold level of the threshold device, the signal will not need to be amplified, because the said threshold device is in a conductive state and provides a second signal whose amplitude increases with that of the first signal. In this case the gain of the amplifier is equal to unity.

The combination of parts of the invention provides a peak detector with rapid response, which follows the amplitude of the signal from the detector means as it varies, provides an output when a peak occurs, in spite of major modulation of the oscillator signal and can adapt to signals of small amplitude. Thus, by virtue of the invention a gain limiter assembly is provided, its gain depending on the amplitude of the signal provided by the detector means, with the result that the assembly only amplifies signals of small amplitude, using little power in comparison with the circuit described in U.S. Pat. No. 3,982,434, which amplifies all the signals and consumes more power. Furthermore, the threshold device, the comparator means, the storing means and the amplifier can easily be implemented using cheap components in a circuit which draws little current.

The threshold device is preferably conductive when the voltage applied thereto exceeds a negative threshold or a positive threshold, i.e. the device is conductive in either sense.

In this implementation, the detector functions to provide an output signal for both positive and negative peaks. In one embodiment, the threshold device comprises two diodes connected back to back. The storing means can also comprise a capacitor. The amplifier is a differential amplifier, one of whose two inputs receives the signal provided by the detector means while the other receives a signal dependent on the second, stored signal and on the output of the amplifier, the output of the amplifier providing the first signal and being connected to the threshold device. A unity gain impedance matching device is connected between the amplifier and the means for storing the second signal, which allows the said storing means to be isolated to some degree from the amplifier and to pass the amplitude of the second signal to the said amplifier.

The impedance matching device is a tracking circuit for example. The comparator means can also comprise an amplifier which receives the first and second signals at its two inputs, so as to compare them. All these components are cheap and operate together drawing very little current.

BRIEF DESCRIPTION OF THE DRAWINGS

The features of the invention will be better understood from a reading of the description which follows, given by way of non-limiting example and with reference to the accompanying drawings, in which.

MORE DETAILED DESCRIPTION

Figure 1:
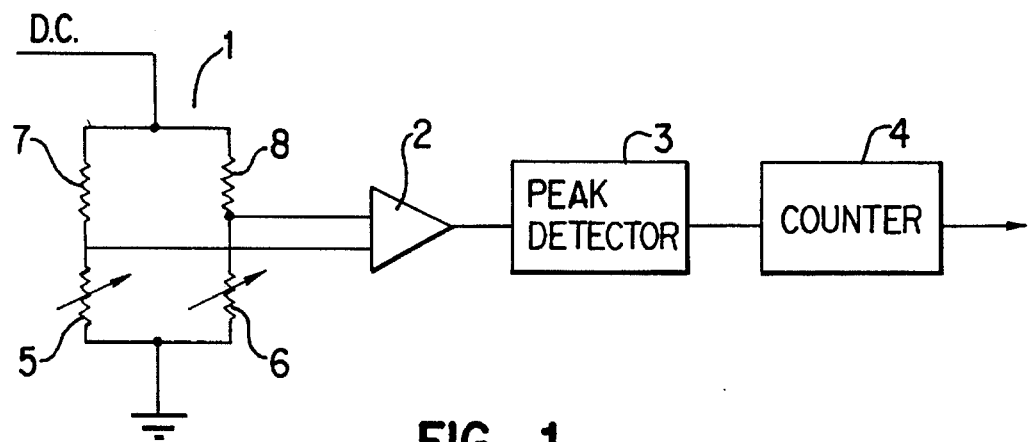
FIG. 1 shows a system for measuring the frequency of oscillation of a fluid oscillator, comprising a peak detector in accordance with the invention.

Referring to FIG. 1, a system for measuring the frequency of oscillation of the fluid within a fluid oscillator comprises detector means 1, an amplifier 2, a peak detector 3 and a counter 4. The detector means are conventional and comprise two thermistors 5, 6 and a source of direct current and two resistors 7, 8. The thermistors are positioned in conjunction with a source of heat and detect the changes in temperature caused by oscillations in the fluid of the fluid oscillator.

Figure 6:
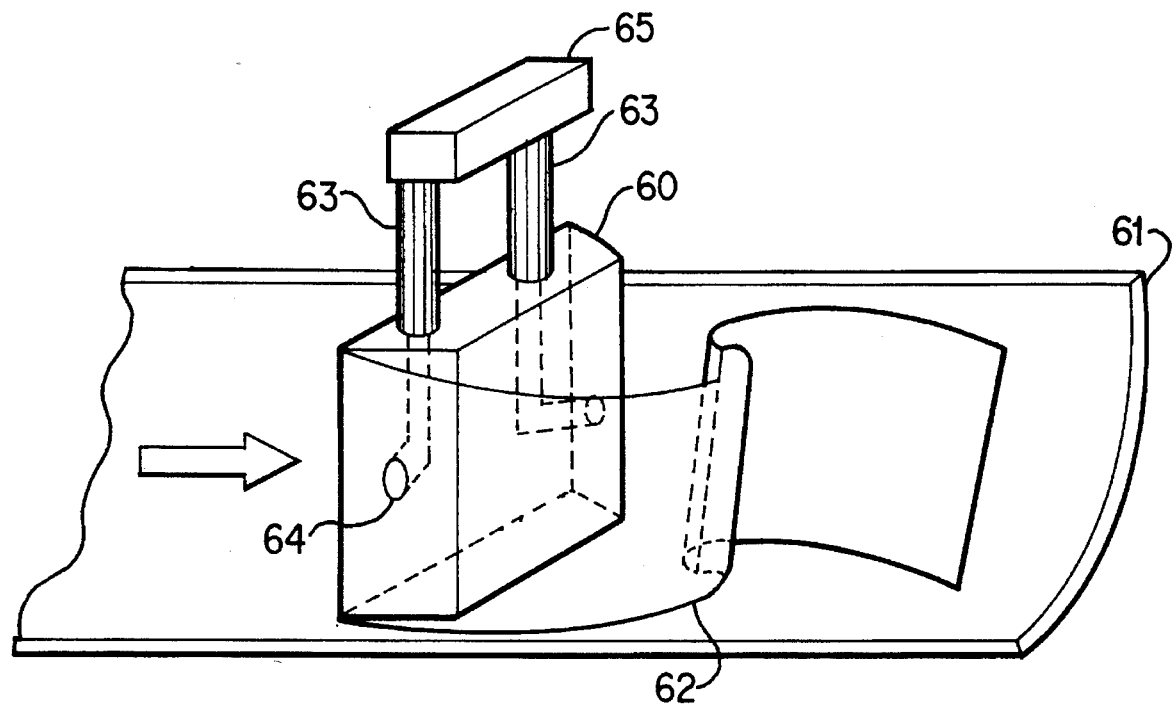
FIG. 6 shows a vortex oscillator for use with the system of FIG. 1.

Referring to FIG. 6, a vortex oscillator is shown in use with the system of FIG. 1 and comprises an obstruction 60 positioned in a pipe 61. The direction of flow of the fluid in the pipe 61 is indicated by the arrow. The flow of the fluid against the obstruction 60 creates vortices 62 in the fluid, which form alternately on one side of the obstacle and on the other side thereof, thus creating the phenomenon of periodic oscillations. A pressure differential forms between the two sides and it oscillates at a frequency proportional to the speed of flow of the fluid. A channel 63 connects orifices 64 formed in the two sides of the obstruction and a portion of the fluid flows in the channel from one orifice to the other, the direction of flow depending on the pressure differential. The vortex oscillator is provided with a detector 65 comprising the thermistors and the heat source of the detector means of the system of FIG. 1. The thermistors and the heat source are disposed in the channel 63, the heat source being positioned between the thermistors. Depending on the direction of flow of the fluid, one thermistor will be downstream of the heat source and the other will be upstream. When the direction of flow changes the situation is reversed.

The changes in the resistances of the thermistors 5, 6 and in the voltages at the terminals of the thermistors arising from the temperature variations of the thermistors are detected by the amplifier 2, which provides an alternating signal to the input to the peak detector. The detector means described above are conventional and well known to the person skilled in the art. Other detectors, such as sensors using the piezoelectric effect, etc. can be used.

The peak detector 3 provides a digital signal corresponding to the number of peaks detected to the input of a counter 4, which provides an output corresponding to the frequency of oscillation and to the speed of the fluid. Construction of a flowmeter using this output lies within the competence of a person skilled in the art.

Figure 2:
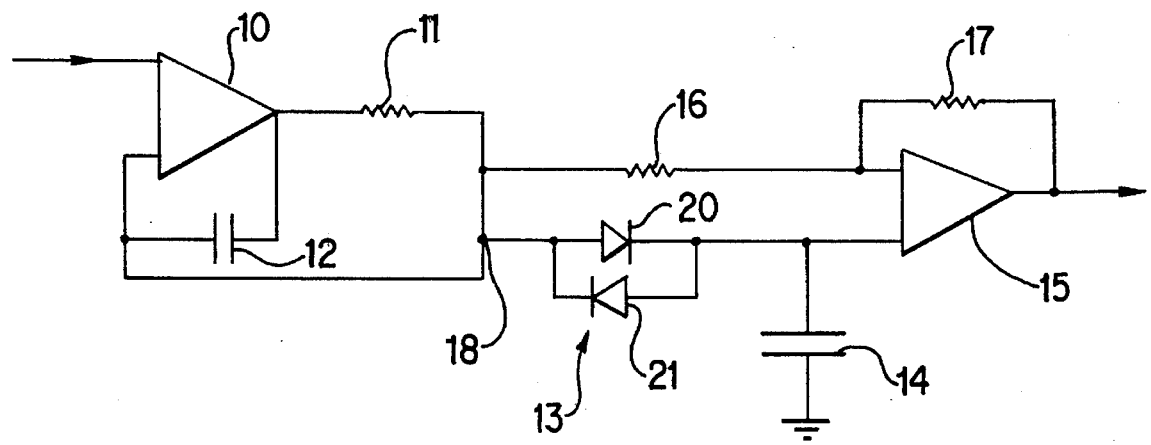
FIG. 2 shows a peak detector which is used in the system of FIG. 1.

As shown in FIG. 2, a peak detector comprises an amplifier 10 with a resistor 11 and a capacitor 12, a threshold device 13 comprising two diodes 20, 21 connected back to back, (i.e. in parallel with opposite to polarity) a capacitor 14 acting as a store, a differential amplifier 15 and resistors 16, 17. Each diode 20, 21 may be the junction of an FET The amplifier 10, the resistor 11 and the capacitor 12 isolate the input signal from the capacitor 14. They can be omitted in other implementations. Each diode is characterized by a threshold and creates a voltage drop when it is in a conductive or ON state. When the amplitude of the signal at the point 18 increases above the threshold of the diode 20, the diode will be in a conductive state and the value of the voltage signal at the point 18, minus the potential drop across the diode, will be stored on the capacitor 14.

The differential amplifier 15 compares the value of the voltage at the point 18 with the value of the voltage on the capacitor 14 and provides a high signal when the voltage at the point 18 is greater than the voltage on the capacitor 14.

When a peak is attained and the amplitude of the signal falls, the difference between the value of the signal at the point 18 and the value of the signal stored on the capacitor 14 falls below the threshold of the diode 20 and the diode 20 becomes non-conductive. The value of the signal held on the capacitor 14 is thus fixed. When the signal at the point 18 falls below the value of the signal on the capacitor 14, the amplifier 15 provides a low signal, showing that a peak is present. When the signal falls below the value of the signal stored on the capacitor 14 by an amount corresponding to the threshold of the diode 21, the diode 21 will become conductive and the value of the signal stored on the capacitor 14 will fall to the value of the signal at the point 18, minus the value of the voltage drop across the diode 21. When a negative peak is reached and passed, the diode 21 will again become non-conductive and the amplifier 15 indicates a change of state when the signal at the point 18 increases above the value of the signal stored on the capacitor 14.

Figure 5:
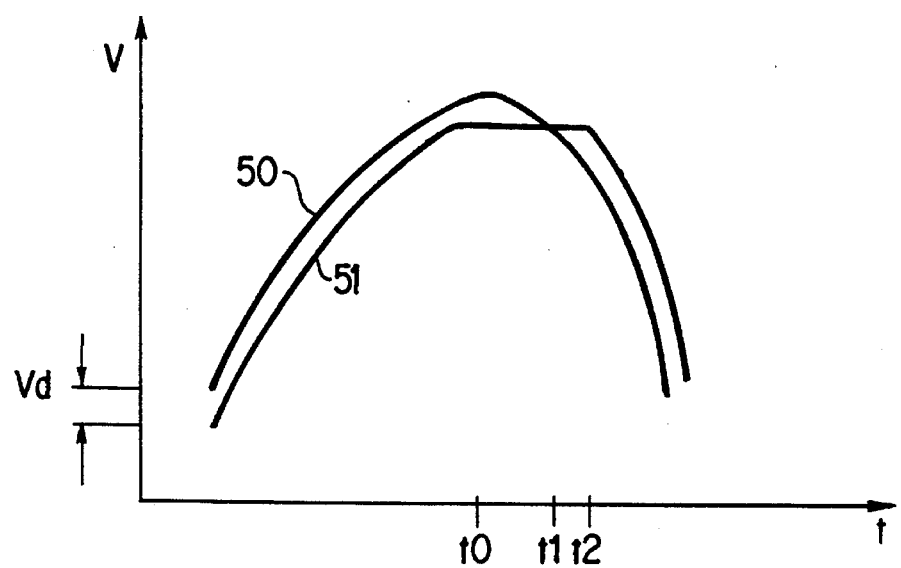
FIG. 5 shows the operation effected on a peak by the peak detector.

FIG. 5 shows the variation of the voltage of the first signal at the point 18 as a curve 50 and the variation of the voltage on the capacitor as a curve 51. Initially the voltage 51 on the capacitor is equal to the voltage of the signal at the point 18, minus the value Vd corresponding to the voltage drop of the diode 20 and the amplifier 15 provides a high signal. When a peak is reached at time t0 and the voltage of the signal at the point 18 falls below the value of the threshold of the diode 20, the voltage on the capacitor is fixed. At time t1 the voltage of the signal at the point 18 falls below the voltage stored on the capacitor and the output of the amplifier 15 provides a low signal. At time t2 the difference between the voltage of the signal at the point 18 and voltage stored on the capacitor is greater than the threshold of the diode 21 and the voltage on the capacitor again follows the voltage of the first signal.

Figure 4:
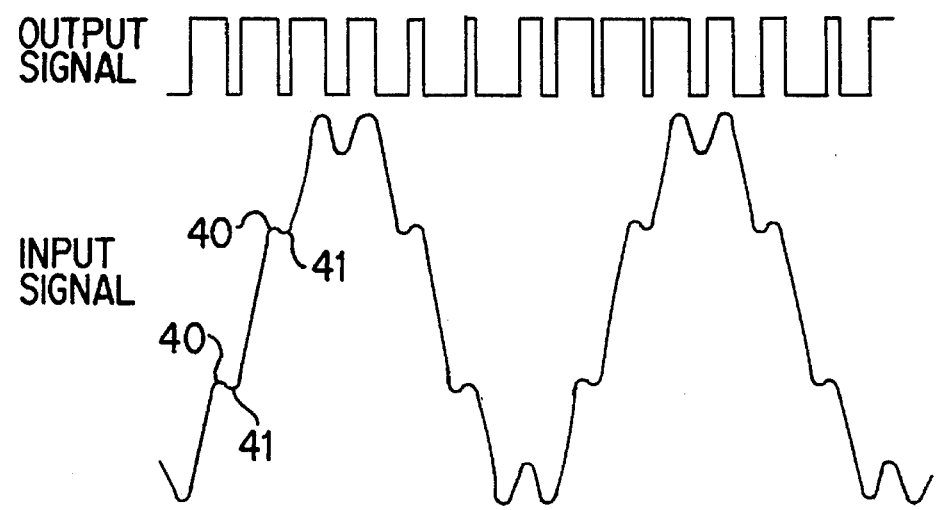
FIG. 4 shows a representative example of the signals at the input and output of the peak detector.

FIG. 4 shows the signal at the output of the circuit of FIG. 2 in comparison with the input signal. The input signal can be regarded as a high frequency sinusoidal signal of small amplitude superimposed on large amplitude noise which produces large variations in the signal amplitude. In spite of these variations, the change in the sense of the signal at each positive peak 40 or each negative peak 41 is marked by a change in the sense of the output signal. The output signal can be used directly by the counter 4 to provide a numerical value corresponding to the frequency of oscillation and of the speed of the fluid entering the oscillation chamber.

Figure 3:
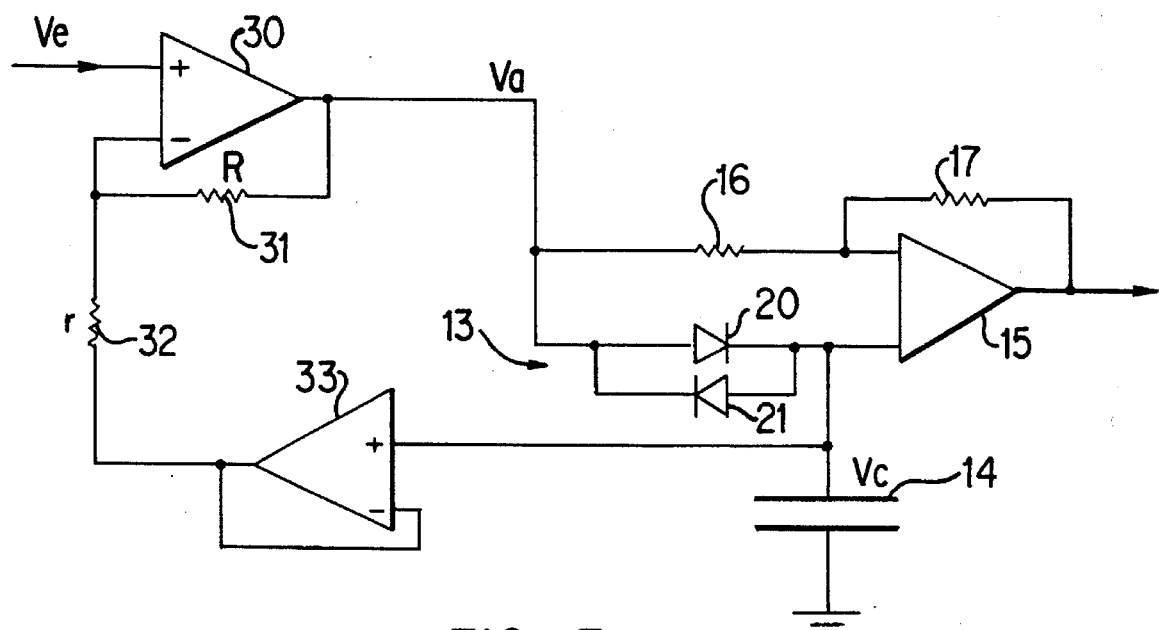
FIG. 3 shows a peak detector which is used in the system of FIG. 1 according to an embodiment of the invention.

FIG. 3 shows a peak detector according to an embodiment of the invention. Parts having the same functions as the parts of FIG. 2 are designated by the same reference numerals.

This embodiment is particularly suitable for detecting signals with an amplitude equal to or less than the threshold level of the threshold device 13 and also comprises an amplifier 30 with associated resistors 31, 32 which determine the actual gain of the amplifier 30, and a unity gain amplifier 33 which provides an output corresponding to the value of the voltage on the capacitor 14 and which isolates the amplifier 30 from the capacitor 14. The assembly 33 is actually a tracking circuit which has an infinite input impedance and a very small output impedance. Thus the capacitor 14 does not discharge and it is not necessary to use a capacitor of high capacitance. For a signal Ve of very small amplitude at its input, the output of the amplifier 30 will be below the threshold Vd of the diodes 20, 21 which remain in a non-conductive state. As a result the voltage on the capacitor 14 remains zero and the amplifier functions with a gain determined by the ratio of values of the resistors 31, 32. When the amplitude of the signal increases, the output of the amplifier 30 exceeds the threshold of the diode 20 and the value of the voltage on the capacitor 14 also increases. The output voltage of the amplifier 33 follows the voltage on the capacitor 14 and the gain of the amplifier 30 reduces progressively when the difference between Ve and the output of the amplifier 33 reduces. In the limit, the gain of the amplifier becomes equal to unity and the amplifier 30 behaves as a follower. However, intermediate values of the signal Ve will be amplified and the threshold device and storing means detect the peaks of this signal.

For the case in which Ve has very small amplitude $$Va < Vd \text{ and } Vc = 0$$

where Va is the output voltage of the amplifier 30, Vd is the voltage drop and threshold of the diodes 20, 21 and Vc is the voltage on the capacitor 14. The actual gain of the amplifier is:

$$Va/Ve = R/r + 1$$

Where R and r are the resistances of the elements 31 and 32 respectively. For a gain of value 10 and for a threshold Vd equal to 0.7 V, the smallest value of Ve allowing the circuit to detect peaks is 0.07 V.

In the other case in which Va > Vd:

$$(Va - Vc)r/R + Vc = Ve$$

and also $$Vc = Va - Vd$$

Thus:

$$Va = Ve + (Vd \times R)/(R + r)$$

For a gain equal to 10 and R = 9r:

$$Va = Ve + 0.9 Vd$$

For Vd << Ve $$Va = Ve$$

Thus, for signals of large amplitude, the gain of the circuit drops to nearly unity while signals of small amplitude are amplified to facilitate detection of the peaks.

Figure 7:
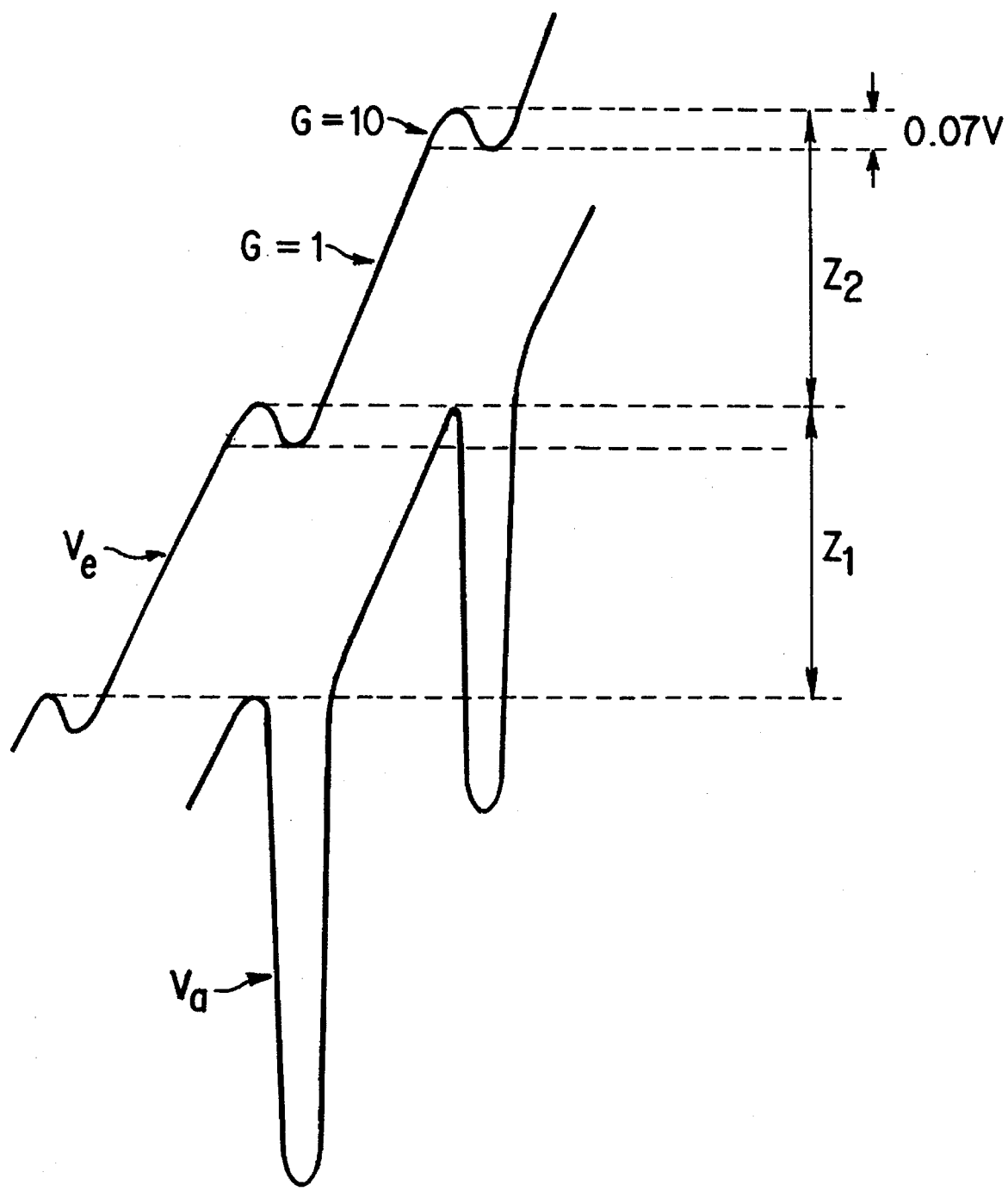
FIG. 7 shows a representative example of the behavior of the system of FIG. 3 for an example of an input signal like that of FIG. 4.

The example in FIG. 7 illustrates the operation of the measuring system and represents an input signal Ve received by the amplifier 30 of the type shown in FIG. 4, as well as the signal Va provided by the said amplifier 30 to the threshold device 13.

The regions Z1 and Z2 are regions in which the voltage Vc follows the voltage Va and in which the gain of the amplifier 30 is equal to unity.

On the contrary, when the signal lies in the regions of the curve shown in dotted lines, the voltage Vc no longer varies, given the reversal in the sense of variation of Va and excursion within the limits of the threshold of the diodes.

As a result, the gain of the amplifier 30 becomes equal to $$G=R/r+1$$

in these regions, being G=10 for the numerical example quoted.

Thus for inversions of small amplitude in the input signal, for example in the order of 0.07 V, the gain limiting assembly whose gain depends on the amplitude depends on the amplitude of the input signal makes it possible to provide the threshold device with a signal Va whose frequency can easily be detected. Furthermore, the peak-to-peak amplitude of the signal Va is compressed to a certain extent relative to that which arises in the case of linear amplification and the assembly described here thus affords use of batteries of low voltage (for example 3V), thus making it possible to reduce the power consumption considerably.

I claim:

1. A system for measuring the frequency of oscillation of a fluid within a fluid oscillator comprising detector means for detecting fluid oscillations and providing a signal representing the oscillations, a peak detector comprising a threshold device receiving a first signal corresponding to the signal representing the oscillations, the threshold device being in a conductive state when a voltage applied thereto exceeds a threshold value, the device then providing a second signal with a drop in potential relative to the first signal, means for receiving and storing the second signal, and comparison means comparing the value of the second, stored signal with the value of the first signal and providing an output signal characteristic of the relative values of the first and second signals, wherein the peak detector further comprises an amplifier which receives and amplifies the signal provided by the detector means and which provides the first signal to the threshold device, the amplifier having a gain which is controlled by the second signal received from the threshold device.

2. A system according to claim 1, wherein the threshold device is in a conductive state when the voltage which is applied thereto exceeds a negative or a positive threshold value.

3. A system according to claim 2, wherein the threshold device comprises two diodes connected in parallel with opposite polarity.

4. A system according to claim 1, wherein the storing means comprise a capacitor.

5. A system according to claim 1, wherein the amplifier is a differential amplifier having two inputs, one of the two inputs of the amplifier receiving the signal provided by the detector means and the other input receiving a signal dependent on the second, stored signal and on the output of the amplifier, the output of the amplifier providing the first signal and being connected to the threshold device.

6. A system according to claim 1, wherein an impedance matching device with unity gain is located between the input of the amplifier and the means for storing the second signal.

7. A system according to claim 6, wherein the impedance matching device with unity gain is a tracking circuit.

8. A system according to claim 1, wherein the comparison means comprise an amplifier which receives the first and second signal at two of its inputs, in order to compare them.

9. A system according to claim 1, wherein said system is a part of a flowmeter.

* * * * *